United States Patent
Carter et al.

(10) Patent No.: US 10,489,445 B1
(45) Date of Patent: Nov. 26, 2019

(54) SYSTEMS AND METHODS FOR ONLINE MATCHING USING VISUAL SIMILARITY

(71) Applicant: EHARMONY, INC., Santa Monica, CA (US)

(72) Inventors: Steve Carter, Pasadena, CA (US); Alex Shah, San Diego, CA (US)

(73) Assignee: EHARMONY, INC., Los Angeles, CA (US)

( * ) Notice: Subject to any disclaimer, the term of this patent is extended or adjusted under 35 U.S.C. 154(b) by 0 days.

(21) Appl. No.: 14/279,031

(22) Filed: May 15, 2014

Related U.S. Application Data (63) Continuation-in-part of application No. 13/310,762, filed on Dec. 4, 2011, now abandoned, and a continuation-in-part of application No. 12/460,156, filed on Jul. 13, 2009.

(51) Int. Cl.
| | |
|---|---|
| *G06F 15/16* | (2006.01) |
| *G06F 16/583* | (2019.01) |
| *G06F 16/95* | (2019.01) |
| *G06K 9/00* | (2006.01) |
| *H04L 29/08* | (2006.01) |

(52) U.S. Cl.
CPC ............ *G06F 16/583* (2019.01); *G06F 16/95* (2019.01); *G06K 9/00248* (2013.01); *G06K 9/00268* (2013.01); *G06K 9/00288* (2013.01); *H04L 67/306* (2013.01)

(58) Field of Classification Search
CPC .......... G06K 9/00221; G06K 9/00268; G06K 9/00302; G06K 9/00006; G06K 9/0027; G06K 9/00248; G06K 9/00288; G06Q 30/02; G06Q 10/063112; G06Q 10/02; H04L 67/306; G06F 17/30864; G06F 17/30247; G06F 17/30657
USPC ...... 382/100, 118; 709/203, 228; 705/1, 319
See application file for complete search history.

(56) References Cited

U.S. PATENT DOCUMENTS

| | | |
|---|---|---|
| 6,067,369 A | 5/2000 | Kamei |
| 6,442,538 B1 | 8/2002 | Nojima |
| 7,760,917 B2 | 7/2010 | Vanhoucke et al. |
| 7,907,755 B1 * | 3/2011 | Perlmutter et al. ........... 382/118 |
| 8,010,556 B2 | 8/2011 | Terrill et al. |
| 8,107,734 B2 | 1/2012 | Ohira et al. |

(Continued)

*Primary Examiner* — Dustin Nguyen
(74) *Attorney, Agent, or Firm* — One LLP; Joseph K. Liu (57) ABSTRACT

A computer-based system for presenting interpersonal relationship analysis and recommendation, comprising: a matching server system, operatively coupled to a public network, wherein the matching server system is configured to: retrieve a plurality of stored images of individuals, including at least a first image and a second image, the second image being of a potential match and having an associated match profile; present the first image to a user via a user-interface device; receive feedback from a first user via the user-interface device, the feedback indicating a level of physical attraction to the individual portrayed in the first image; generate a compatibility value for the user and the potential match, the compatibility value generated based on at least the user feedback and a calculated visual similarity between the first image and the second image; and present the match profile of the potential match to the user based on the generated compatibility value, including means for the user to contact the potential match.

14 Claims, 7 Drawing Sheets

(56) References Cited

U.S. PATENT DOCUMENTS

| | | | |
|---|---|---|---|
| 8,595,257 B1* | 11/2013 | Ovide | G06Q 50/01 707/784 |
| 9,342,855 B1* | 5/2016 | Bloom | G06Q 50/01 |
| 2003/0043194 A1* | 3/2003 | Lif | G06Q 10/02 715/764 |
| 2003/0130035 A1* | 7/2003 | Kanarat | A63F 13/10 463/31 |
| 2004/0133582 A1* | 7/2004 | Howard | G06K 9/00006 |
| 2004/0167794 A1* | 8/2004 | Shostack | G06Q 30/02 709/204 |
| 2004/0210661 A1* | 10/2004 | Thompson | 709/228 |
| 2005/0043897 A1* | 2/2005 | Meyer | G06F 17/30247 702/19 |
| 2005/0063569 A1* | 3/2005 | Colbert | G06K 9/00275 382/118 |
| 2005/0280502 A1 | 12/2005 | Bell | |
| 2006/0018522 A1 | 1/2006 | Sunzeri et al. | |
| 2006/0287878 A1* | 12/2006 | Wadhwa et al. | 705/1 |
| 2007/0071290 A1* | 3/2007 | Shah | G06K 9/00288 382/118 |
| 2008/0052312 A1* | 2/2008 | Tang | G06F 17/30247 |
| 2008/0279419 A1* | 11/2008 | Kluesing et al. | 382/100 |
| 2008/0306826 A1 | 12/2008 | Kramer et al. | |
| 2009/0037521 A1* | 2/2009 | Zilca et al. | 709/203 |
| 2009/0106043 A1* | 4/2009 | Buckwalter | G06Q 30/02 705/319 |
| 2009/0164464 A1* | 6/2009 | Carrico | G06F 17/30657 |
| 2010/0076775 A1 | 3/2010 | Tesler et al. | |
| 2011/0044536 A1 | 2/2011 | Cobb et al. | |
| 2011/0058743 A1* | 3/2011 | Myers | G06K 9/00288 382/190 |
| 2011/0129145 A1 | 6/2011 | Perlmutter et al. | |
| 2012/0059850 A1* | 3/2012 | Bent | G06Q 30/0269 707/776 |
| 2012/0296973 A1* | 11/2012 | Spivak | G06Q 10/02 709/204 |
| 2013/0259324 A1* | 10/2013 | Huang | G06K 9/00281 382/118 |
| 2014/0122472 A1* | 5/2014 | Wells | G06F 17/30864 707/732 |

\* cited by examiner

SYSTEMS AND METHODS FOR ONLINE MATCHING USING VISUAL SIMILARITY

CROSS-REFERENCE TO RELATED APPLICATIONS

This application is a continuation-in-part of U.S. application Ser. No. 13/310,762, filed Dec. 4, 2011, abandoned Nov. 8, 2014, which claims the benefit of U.S. Provisional Application No. 61/420,759, filed Dec. 7, 2010, which applications are hereby incorporated in their entirety by reference. This application is also a continuation-in-part of U.S. application Ser. No. 12/460,156, filed Jul. 13, 2009, which application is hereby incorporated in their entirety by reference.

FIELD OF THE INVENTION

The field of the invention relates to systems and methods for operation of a matching service, and more particularly to systems and methods for online matching using visual similarity.

BACKGROUND OF THE INVENTION

Research has shown that the success of human interpersonal relationships depends on complex interactions between a large number of variables including, but not limited to, personality, socioeconomic status, religion, appearance, ethnic background, energy level, education, interests and appearance. Matching services have developed effective systems that analyze these variables to identify and match people who have the potential to establish a successful relationship. A well-known example of such a service is eHarmony, Inc. (which can be found at www.eharmony.com). A matching service generally collects and stores data to create a "profile" for each user. The profile includes a number of factors potentially relevant to establishing a successful interpersonal relationship with that user. The matching service then correlates that user's profile with others in its database to assess which profiles are compatible, i.e., which users have the potential for a successful relationship when matched. The potential matches are then presented to the user along with means for initiating and/or facilitating the interpersonal relationship between the user and the potential match.

The variables used by these matching services are generally self-identified—i.e. users are required to explicitly indicate the existence and/or extent of interests, traits, qualities and/or preferences that they identify in themselves or that they desire in a potential match. Appearance, or physical attractiveness, is one such variable that is difficult to predict accurately through survey evidence. And while physical attraction generally becomes less critical to a meaningful relationship as the relationship continues, it is often the make-or-break factor in initiating the relationship.

Websites such as hotornot.com and facemash.com offer forums where users can review user submitted photos of members and indicate the physical attractiveness of the depicted individual. Some of these websites offer the ability to initiate communications with the users depicted in the photos. However, these websites generally use randomly generated photos and focus solely on physical appearance. As such, they are limited in their ability to present opportunities for long lasting interpersonal relationships to their users. Moreover, these websites are dependent on user uploaded photos, and so the pool of potential candidates for a relationship is limited.

Accordingly, alternative systems and methods for facilitating interpersonal relationships may be desirable.

SUMMARY OF THE INVENTION

The field of the invention relates to systems and methods for operation of a matching service.

In a preferred embodiment, the system includes a matching server system, operatively coupled to a public network. The matching server system is configured to: store a first image of a first individual in a database; store a second image (e.g. an unviewed image) of a second individual in the database; retrieve and present the first image to a user via a user-interface device; receive feedback from a first user via the user-interface device, the feedback indicating a level of physical attraction to the individual portrayed in the first image; generate a compatibility value for the user and the second individual, the compatibility value generated based on at least the user feedback and a calculated visual similarity between the first image and the second image; and present a match profile of the second individual to the user based on the generated compatibility value.

Other systems, methods, features and advantages will be apparent to one of ordinary skill in the art from the following figures and detailed description, which illustrate, by way of example, the principles of the present invention.

BRIEF DESCRIPTION OF THE DRAWING(S)

Illustrated in the accompanying drawing(s) is at least one of the best mode embodiments of the present invention. In such drawing(s).

DETAILED DESCRIPTION OF THE PREFERRED EMBODIMENTS

The above described drawing figures illustrate the invention in at least one preferred, best mode embodiment, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present system and method.

Figure 1:
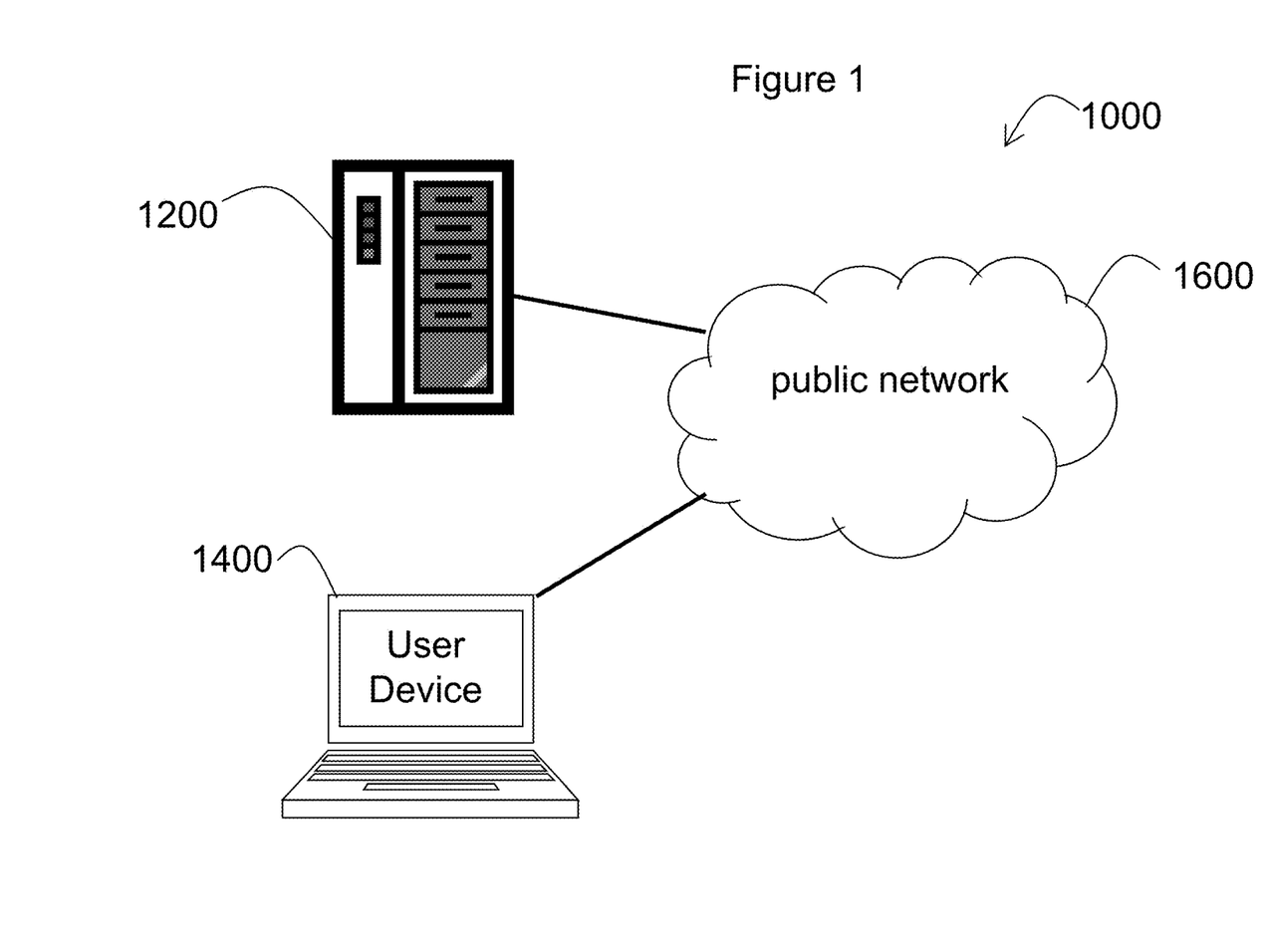
FIG. 1 is an exemplary diagram of an online interpersonal match system in accordance with a preferred embodiment of the present invention.

FIG. 1 shows a computer-based matching system 1000 in accordance with a preferred embodiment of the present invention. The system generally includes a matching server system 1200, which may distributed on one or more physical servers, each having processor, memory, an operating system, and input/output interface, and a network interface all known in the art, and one or more end user interface devices 1400 coupled to a public network 1800, such as the Internet and/or a cellular-based wireless network.

Figure 2:
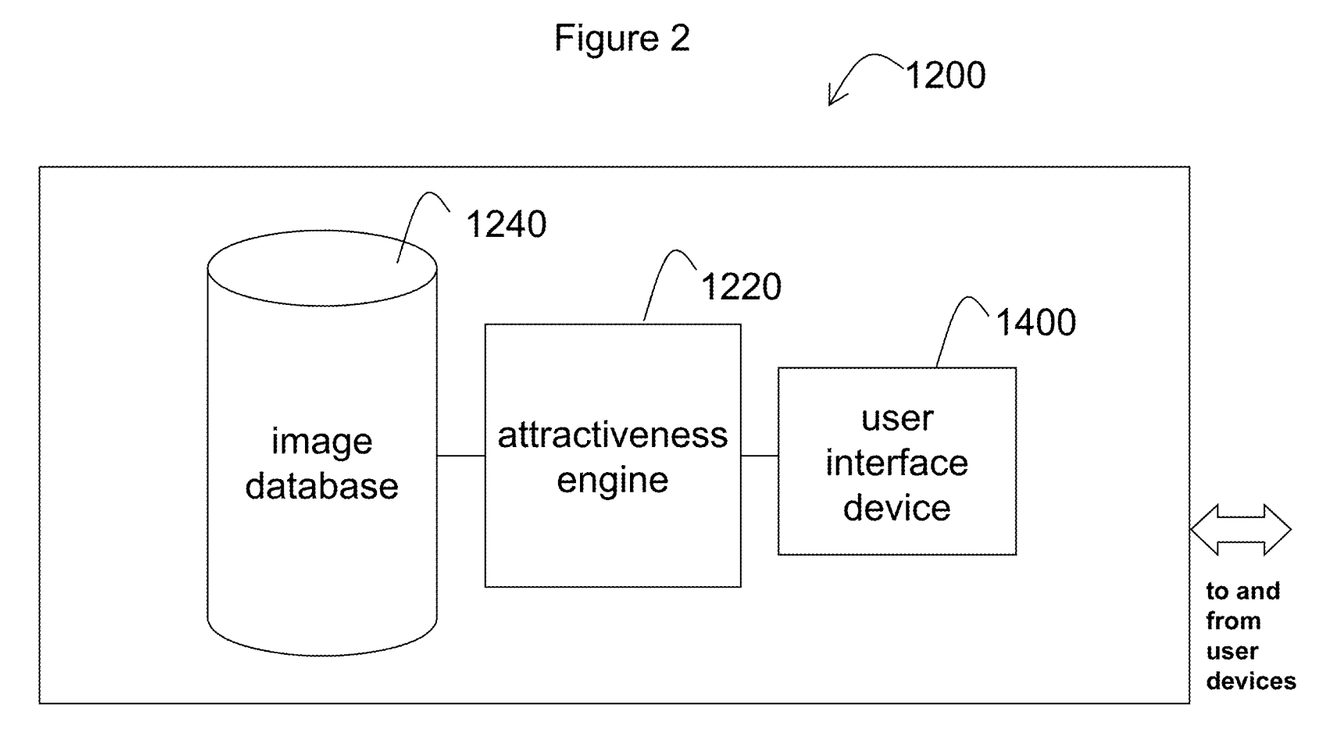
FIG. 2 is an exemplary diagram of a matching system server in accordance with a preferred embodiment of the present invention.

An exemplary embodiment of the matching server system is shown in FIG. 2. The matching server system generally includes a computer application designed to match an end user with a potential match to whom the end user is physically attracted to. In general, the matching server system is designed to be utilized by an online dating service in matching clients.

An attractiveness scoring engine 1220 calculates an attractiveness value for a potential match based on empirical data collected from the user, including the user's previous indications related to the physical attractiveness of other potential matches, or beta images. The calculated attractiveness value is unique to each user-potential match pairing and serves to identify the likelihood that the user will be physically attracted to the potential match. If an attractiveness value meets a predefined threshold, then there is potential that the user will find the potential match physically attractive if matched. This calculation can also incorporate data based on the history of other users with comparable empirical data, thereby enabling a feedback system that allows the system to "learn" how to optimize the calculation. This process can also involve developing and utilizing a "neural network" or "learning algorithm" to resolve problems in complex data. Details of exemplary calculations and correlation processes and the neural network are also described in U.S. Pat. No. 7,454,357, issued to J. Galen Buckwalter et. al. on Nov. 18, 2008, which is hereby incorporated by reference in its entirety ("the Buckwalter patent"), which describes an exemplary compatibility value in the form of a "satisfaction index."

At least one representative image for each potential match is retrievably stored in an image database 1240 that is communicatively coupled to the attractiveness scoring engine. Additional beta images—which may be control images of individuals other than potential matches (e.g. celebrity and/or model photographs)—may also be stored in the image database along with the representative images. The beta images may be used in accordance with the described systems and methods to obtain additional data points used in calculating the attractiveness value of the potential match. As described in detail herein, the representative images may be stored as part of a match profile of other end-users of the dating service utilizing the instant matching system and/or pseudo match profiles of match profiles of end users of other dating services.

A feature vector for each image is stored in association with that image and is used by the attractiveness scoring engine to determine a distance between images in "feature space." The distance may be calculated through known mathematical methods for calculating distances in vector spaces, including statistical models, neuro-networks and/or support vector machine probability methods. The details of exemplary calculations related to feature vectors utilized in matching systems are discussed in U.S. patent application Ser. No. 13/310,762, filed by Alex Shah on Dec. 4, 2011 ("the Shah patent"), which is hereby incorporated by reference in its entirety.

The attractiveness scoring engine queries the user with one or more representative and/or beta image retrieved from the image database. Preferably, the query involves presenting the user with the one or more of the images via the user interface device 1400 and receiving, via the user interface, an indication of user's physical attraction to the individual portrayed in the image. The query may consist of one or more images randomly selected by the attractiveness scoring engine, or may consist of one or more images selected according to their similarities to other images the user previously indicated physical attraction to (i.e. based on the image's attractiveness value for the user).

Figure 3:
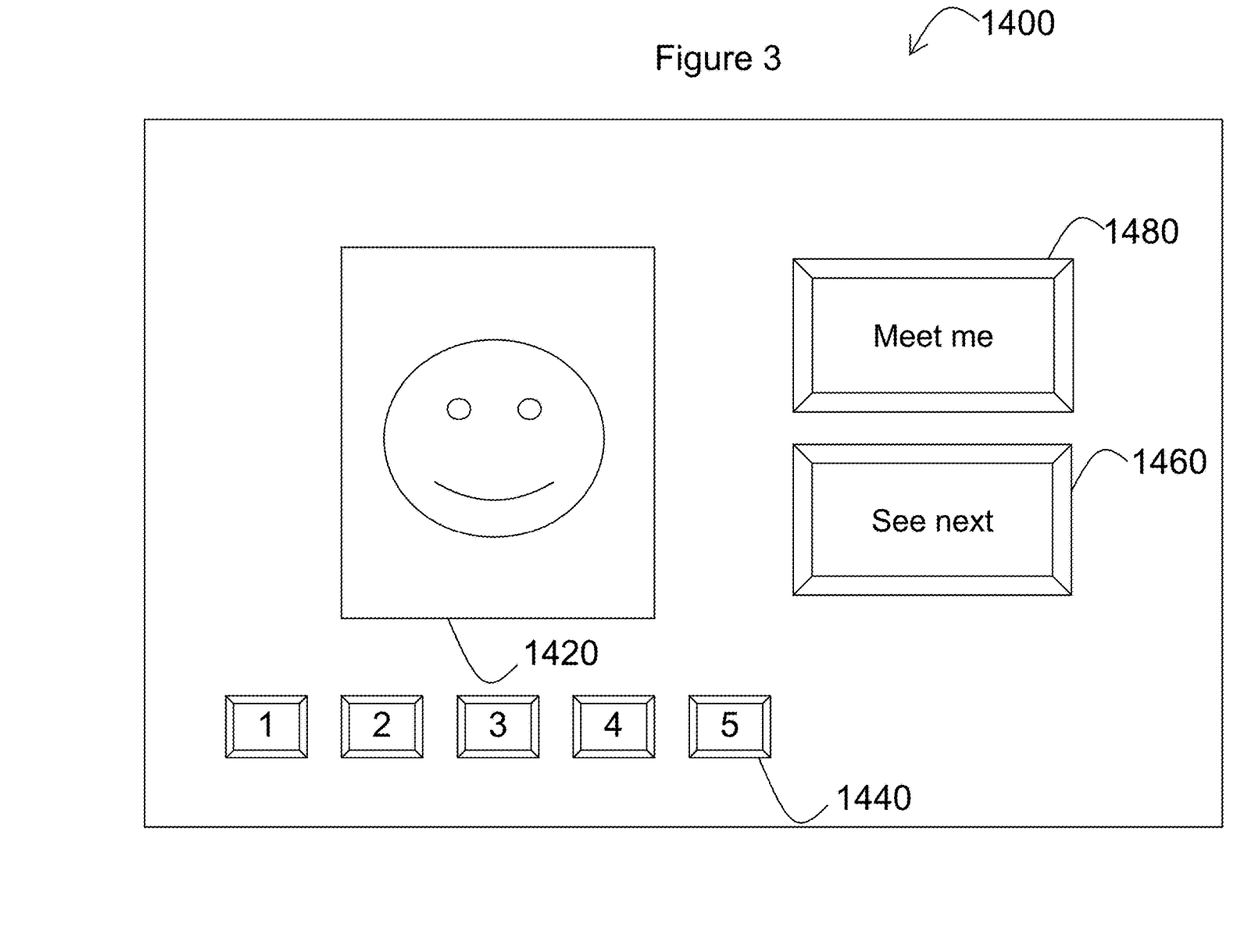
FIG. 3 is an exemplary diagram of a user interface in accordance with a preferred embodiment of the present invention.

FIG. 3 shows an exemplary user interface for conducting the query. At least one image 1420 (either representative of a potential match, or beta) of at least one individual is provided for the user to view. The image may be a still image, or may be a video image, but preferably includes the individual's face. Provided with the image is a means for the user to indicate a physical attraction level the user has with to the individual shown by the image (i.e. rate the physical attractiveness of the individual). This may include, for example, a series of interactive rating buttons 1440 the user may use to rate, e.g. from 1 to 5, the attractiveness of the individual shown in the image. Alternatively, the rating means may include a fillable field (not shown) where the user can input the rating. In at least one embodiment, the rating means includes an interactive (i.e. "clickable") image, or portion thereof, enabling the user to select one image from among multiple presented images and/or one individual from a group image—thereby indicating a hierarchy of user preference.

The rating process provides user preference data that is communicated to the attractiveness scoring engine and used by the attractiveness scoring engine to calculate an attractiveness value with respect to similar (i.e. close in feature space) images in the image database. For example, if a user gives the image of a blonde haired, blue eyed individual a high rating, the calculated attractiveness values for other images of blonde haired, blue eyed individuals may experience corresponding boosts as to that user. The user preference data may be stored in a database and associated with a user profile.

In order to further refine the attractiveness value calculation, the attractiveness scoring engine iteratively queries the user with one or more additional representative and/or beta image retrieved from the image database. Accordingly, an interactive "next" button 1460 may be provided via the user interface, which when clicked by the user causes the attractiveness scoring engine to present another image (or set of images) to the user for rating. This new image (or set of images) is preferably based at least partially on the image's calculated attractiveness value.

As described herein, if attractiveness value of a potential match meets a predefined threshold, then there is potential that the user will find the potential match physically attractive if matched. Accordingly, matching server system, on determining the predefined threshold met, enables the user to initiate an interpersonal relationship request with the potential match. To this end, as shown in FIG. 3, the user interface may include a "meet me" button 1480 that when clicked by the user presents the user with one or more options for initiating interpersonal relationship request. This may include enabling email communications, real-time textual or video chatting, or other contact means. In at least one embodiment, enabling the user to initiate an interpersonal relationship request includes presenting an offer to the user to join the dating service employing the matching server system. In this manner, the matching server system may be used as a "testing the water" phase prior to the user subscribing to the dating service.

In at least one embodiment, the matching server system uses the relative attractive values of potential matches to prioritize the presentation of potential matches—with or without utilizing the predefined threshold attractiveness value—such potential matches determined as described in general with reference to compatibility matching below.

Figure 4:
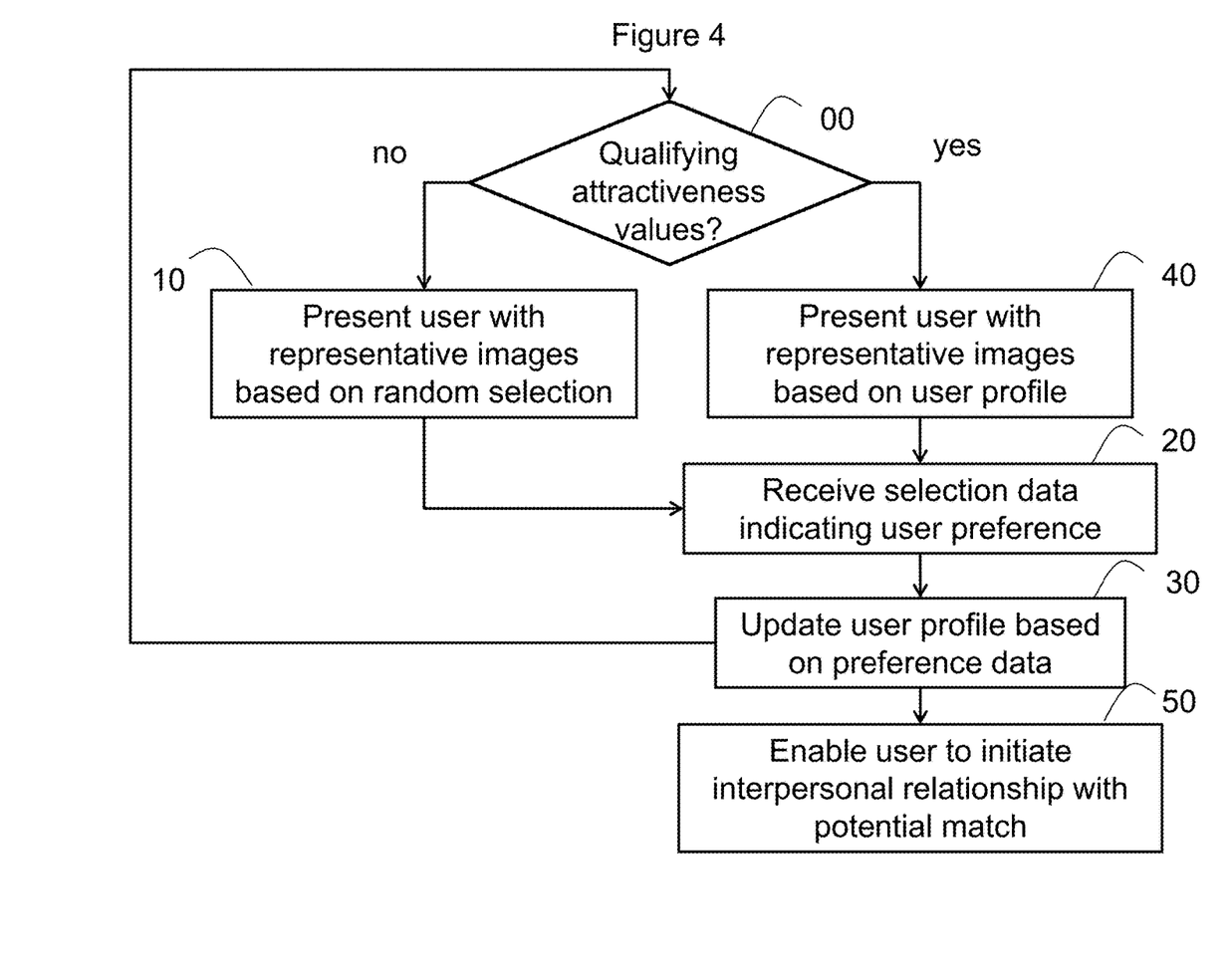
FIG. 4 is an exemplary flow-chart of a matching process in accordance with a preferred embodiment of the present invention.

Turning now to FIG. 4, an exemplary process in accordance with a preferred embodiment of the present invention is shown.

At action block 00, the attractiveness scoring engine calculates the attractiveness values for the images stored in the image database and determines whether there are any qualifying images, i.e. whether a minimum number of images meet a minimum threshold value. Preferably, the minimum number of images and the threshold value are predetermined so as to optimize the accuracy of the attractiveness value calculation, i.e. so as to seed the ranking process.

At action block 10, if the calculated attractiveness values for at least one of the images stored in the image database do not meet a minimum threshold, the user is presented with at least one image (either representative of a potential match, or beta) of at least one individual selected randomly by the attractiveness scoring engine. The presentation occurs via the user interface device, preferably over the public network.

At action block 20, user preference data indicating a degree of user attraction to the individual in the image is received by the attractiveness scoring engine from the user interface device. This may include, for example, a rating, e.g. from 1 to 5, the attractiveness of the individual shown in the image, or an indication that the user is more attracted to one individual shown in an image than to another.

At action block 30, the calculated attractiveness values associated with the images in the image database (e.g. unviewed images) are updated with respect to the user based on the received preference data. This may occur via the generation and updating of the user profile according to the received preference data.

If the calculated attractiveness values for at least one of the images stored in the image database do not meet a minimum threshold, the process returns to action block 10. This is an iteration of the process where more preference data is needed in order to further refine the determination of which images get presented to the user. However, if the calculated attractiveness value for at least one of the images stored in the image database does meet a minimum threshold, the process proceeds to action block 40.

At action block 40, the user is presented with at least one image (either representative of a potential match, or beta) of at least one individual whose associated attractiveness value exceeds the minimum threshold. Then the process proceeds to action block 20. This is an iteration step that further refines the calculation of the attractiveness values of the images in the image database with respect to the user. In some embodiments, the calculated attractiveness values for unviewed images are used to prioritize the presentation of the unviewed images (e.g. potential matches), whether or not they meet the predefined threshold attractiveness value.

At action block 50, if the image is representative of a potential match with whom the user is likely to be physically attracted to if matched (i.e. the attractiveness value exceeds the predetermined threshold), then the user is given the option to initiate an interpersonal relationship request, such as sending an email, or real-time textual or video chat message.

In at least one embodiment, the attractiveness scoring engine is a visual similarity engine that uses a plurality of visual features or characteristics related to the face or head in determining whether representative images of potential matches (e.g. the unviewed images) are visually similar to images having high attractiveness values. In some examples where a single feature or characteristic of a person's head or face is used, the visual similarity may relate to hair (e.g., color or length), eyes (e.g., distance apart, color, shape, or double/single eyelid), etc. In other cases it is the overall or entire placement or arrangement of features in a face or head (e.g., round face versus heart shaped face; symmetric or even distribution of eyes, nose, etc.). Some other examples include skin coloring, mouth shape, face shape, hair color, and/or symmetry of features. In some embodiments, it pertains to the body (i.e., other than the head) such as whether two people have similar height, weight, body mass indices, etc.) In some cases it pertains to qualities of the photo subject, such as manner of dress, pose, posture, etc. In some cases it pertains to qualities of the photo composition, items in the photo not including the person using the system, clarity of the photo, contrast of the photo, etc. The details of an exemplary visual similarity engine are described in U.S. patent application Ser. No. 12/642,139 filed by Steven R. Carter, et al., on Jul. 13, 2009 ("the Carter application"), which is hereby incorporated by reference in its entirety.

Importantly, the matching systems and methods described herein may be part of an overall compatibility matching system designed to match end users who have the potential to establish a successful interpersonal relationship utilizing a variety of factors and variables, including but not limited to physical attraction.

Figure 5:
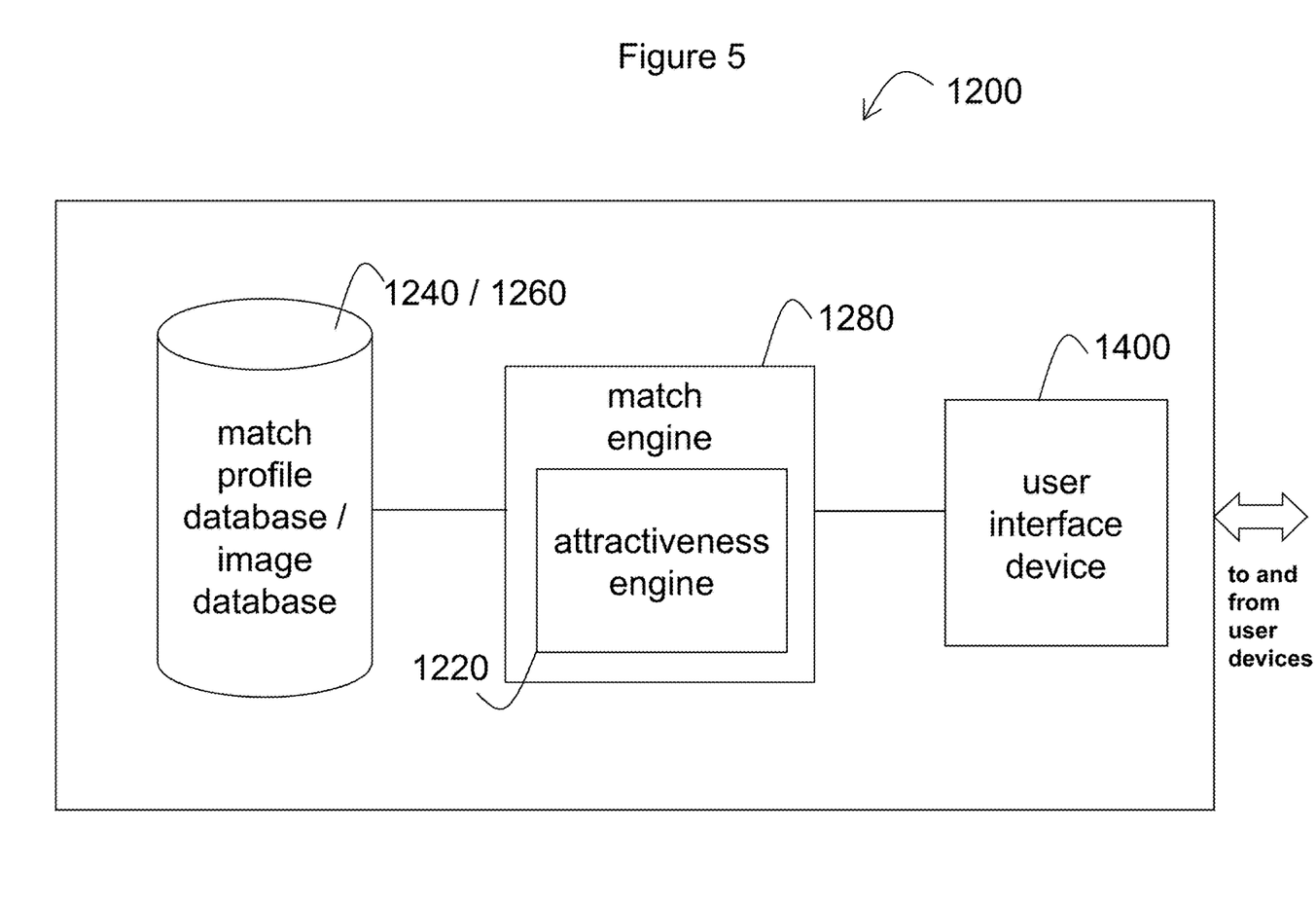
FIG. 5 is an exemplary diagram of a matching system server in accordance with a preferred embodiment of the present invention.

An exemplary embodiment of such a matching server system is shown in FIG. 5. In at least this embodiment, the matching server system generally includes a computer application designed to match end users who have the potential to establish a successful interpersonal relationship. To obtain potential matches, each user establishes a "match profile" that includes data and factors potentially relevant to establishing a successful interpersonal relationship with that user. These factors can be organized into three major categories (1) physical attraction; (2) interpersonal interests, traits and preferences, such as hobbies, geographical location, occupation, and sexual orientation; and (3) deep psychological traits and preferences, such as curiosity and interests. These factors are generated from empirical data collected from the user. An exemplary approach to establishing a match profile for a user is described in detail in the Buckwalter patent.

These match profiles are stored in a match profile database 1260 and organized by the user's match profile identification ("ID"). In the process of creating potential matches for a particular user, a match engine 1240 queries the user's match profile by its respective ID, and correlates that profile with other profiles to calculate a compatibility value. If two profiles generate a compatibility value that meets a predefined threshold, then there is potential for the two respective users to have a satisfactory and/or successful interpersonal relationship if matched. This calculation can also incorporate data based on a user's previous history of matches and satisfaction rate as well as the history of other users with comparable empirical data, thereby enabling a feedback system that allows the system to "learn" how to optimize the correlation calculation. This process can also involve developing and utilizing a "neural network" to resolve problems in complex data. Details of this calculation and correlation process and the neural network are also described in the Buckwalter patent, which describes an exemplary compatibility value in the form of a "satisfaction index."

In at least one embodiment, the attractiveness scoring engine 1200a is utilized according to the embodiments described herein to calculate attractiveness values used by the match engine in calculating the compatibility between match profiles of the end-users. In this embodiment, the images stored in the image database are preferably stored in association with the match profiles of potential matches in the match profile database. In at least some embodiments, the user preference data includes whether, on presentation of a potential match profile, the user elects to initiate an interpersonal relationship request.

In at least one embodiment, the potential match is presented to the user based on at least the attractiveness value of the potential match, and/or the potential match's visual similarity to other individuals reviewed by the user. In some embodiments, the person being matched declines a presented potential match and such declination is stored as user preference data.

From the point of view of the person being matched, using the attractiveness scoring engine to select potential matches can provide a better matching experience. For people being matched who demonstrate a consistent and/or strong preference for certain visual features or characteristics, the matches selected by and presented by matching system will better appeal to the preference of the person being matched. The matching engine may select high quality (i.e., compatible) potential matches, but a user may reject those potential matches because of (for example) the physical depiction of a potential match in their match profile photo, even though the potential match has measured qualities or characteristics that make them a compatible candidate for a long term or lasting relationship. Put another way, people receiving matches characteristically possess subjective criteria for accepting a match which may have little or no relation to the attributes being considered when determining the compatibility of matches for a long term relationship. For users who express or otherwise display a definite and/or focused preference for potential matches having certain physical characteristics or features that can be observed visually, the attractiveness scoring engine can generate attractiveness values that will increase the relative presentation frequency of potential matches whom the user accepts, thus increasing the proportion of potential matches accepted overall in the system and improving users' experience with matching server system, and/or the online dating service operating the matching server system. From the point of view of the matching service or company, users having a better experience and accepting more potential matches will be more likely to subscribe, more likely to communicate with other users, and more likely to enter into a successful relationship.

In some embodiments, other similarities in addition to or as an alternate to visual similarity are used, such as linguistic similarity, psychographic similarity, demographical similarity (e.g., age, religion, education, income level, smoking/nonsmoking, pet owner, marital status (e.g., divorced, widowed, or never married), number of children (if any), profession or industry, etc.), and/or semantical, self-designation (e.g., a response to a multiple choice question, an open-ended question, or a close-ended question). When lacking a history of accepting or rejecting matches for a specific user, in some embodiments the system may use the histories of similar users to generate recommendations and select matches for presentation. The Carter patent application describes exemplary systems and methods for weighting visual similarity as well as other similarities in the overall calculation of a compatibility score.

In at least one embodiment, the user may not be a member of the dating service operating the matching system. In such embodiments, the matching system may nonetheless enable the user to view one or more representative images (and/or beta images) as an enticement to subscribe to the dating service (i.e. the system may be used to enable prospective dating service clients to window-shop for potential matches). The system may create a temporary (i.e. 'dummy') profile for the user to be used in accordance with the above embodiments in order to determine the likelihood the user will be physically attracted to a potential match if matched. If the user elects to initiate an interpersonal relationship request, the system may be configured to prompt the user to subscribe to the dating service, or otherwise pay for the introduction. If the user elects to join the dating service, the information stored in association with the dummy profile may be used as empirical evidence in generating the user's match profile.

Third Party Site Photos

In some embodiments, the representative images of potential matches are limited to other end-users who are subscribers to the dating service operating the matching system. However, in at least one embodiment, the representative images of potential matches include end-users of other dating services, or none at all.

Figure 6:
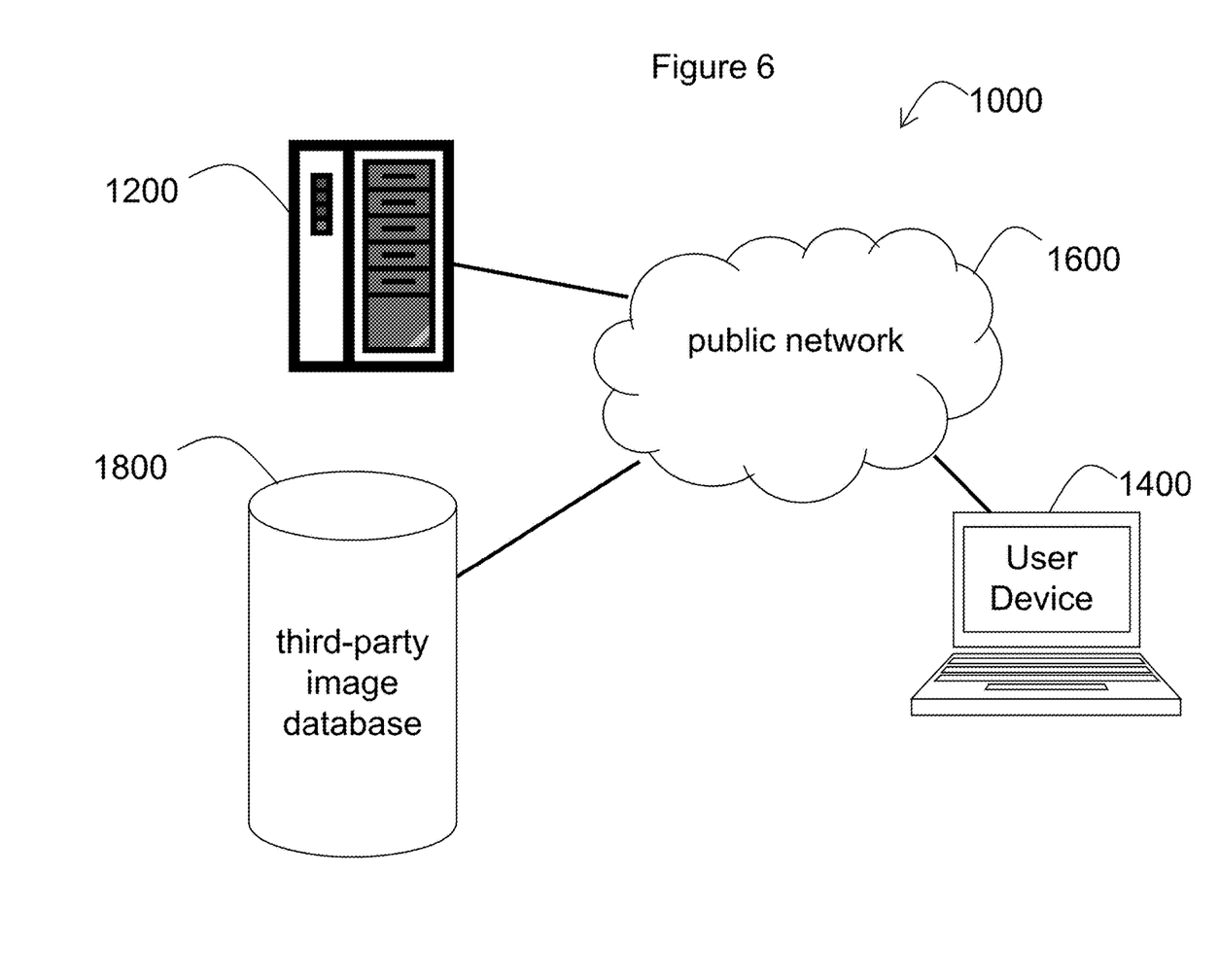
FIG. 6 is an exemplary diagram of an online interpersonal match system in accordance with a preferred embodiment of the present invention.

FIG. 6 illustrates an exemplary matching system that is similar to the matching system shown in FIG. 1. However, a third-party image database 1800 is also communicatively coupled to the network and is accessible by the matching system. The third-party image database may be part of a third-party server system (not shown) that supports, for example, a social networking website, a third-party online dating site, or other website where images of individuals are stored with accessible profile information, and may store the images and associated profile information. It will be understood that the third-party image database may consist of one or more databases across one or more servers belonging to one or more third-parties.

Figure 7:
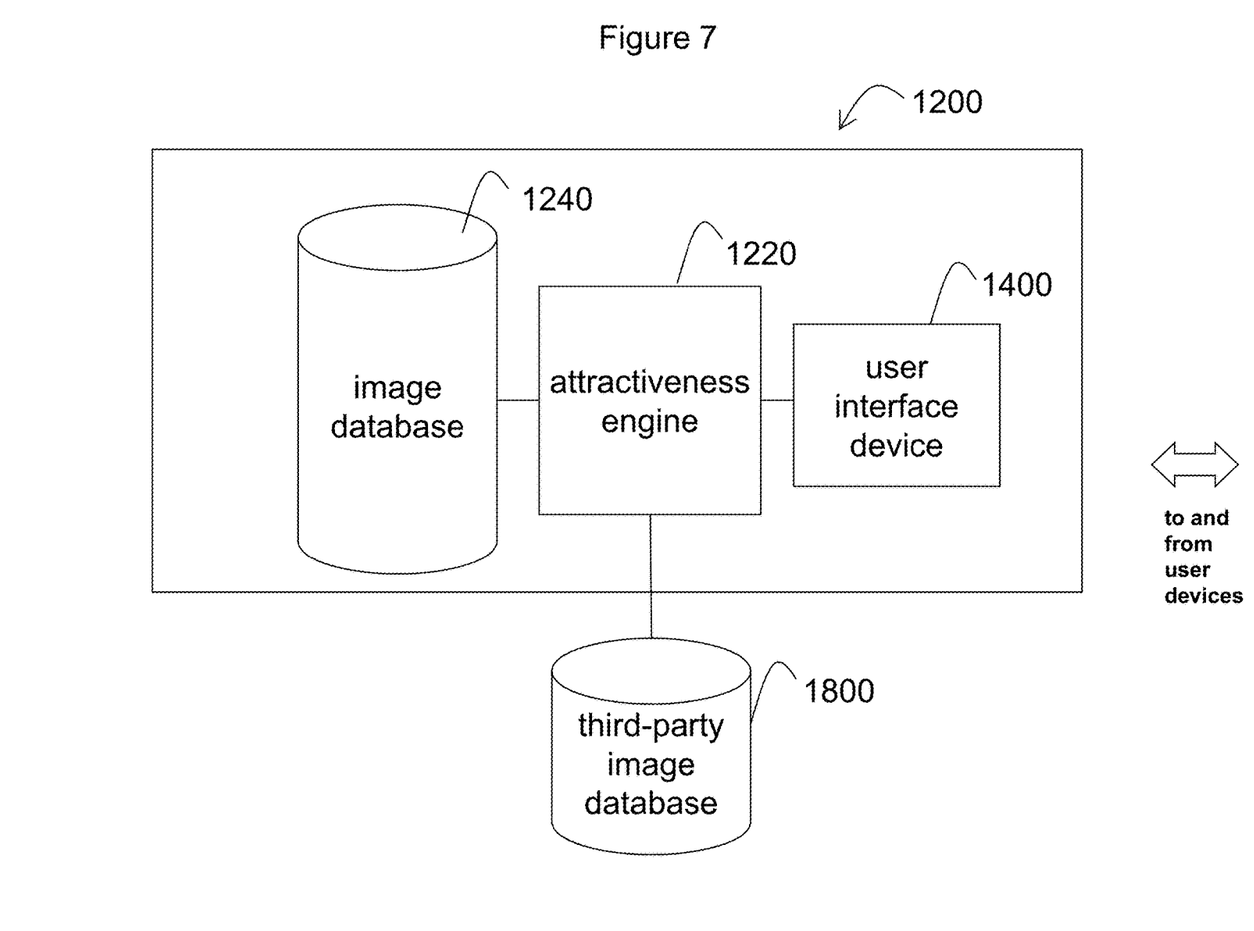
FIG. 7 is an exemplary diagram of a matching system server in accordance with a preferred embodiment of the present invention.

As shown in FIG. 7, the attractiveness scoring engine may retrieve images from the third-party image database for use in determining attractiveness values for potential matches for the user. In at least one embodiment, the images from the third-party database are used as beta images. In this manner, the number of available beta images is increased and further refinement of attractiveness calculations is possible.

In at least one embodiment, the images from the third-party database comprise additional potential matches for the user. In other words, the matching system enables the user to search for visually appealing potential matches across, for example, other dating service and/or social network websites. Accordingly, when the user indicates he/she would like to initiate an interpersonal relationship request (FIG. 4, action block 50) with a potential match that is part of the third-party website, the matching server system may operate to present the request to the potential match. For example, using the information associated with the potential match's third-party website profile, the matching server system may send an email to the potential match, the email consisting of an invitation to join the dating service operating the matching system and informing the potential match that the user is interested in connecting. Such a communication may also include the match profile information of the user.

In addition to the recorded response being used for match profile generation, the recorded response is associated with the particular user and stimuli that produced the response and is retrievably stored in memory, at action block 50. As mentioned above, the recorded response may be retrieved from memory to be provided as stimulus to another user, e.g. by viewing it.

The enablements described in detail above are considered novel over the prior art of record and are considered critical to the operation of at least one aspect of the invention and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that the named inventor believes that the claimed subject matter is what is intended to be patented.

What is claimed is:

1. A computer-based system for presenting interpersonal relationship analysis and recommendation, comprising:
   a matching server system having an attractiveness scoring engine and being operatively coupled to a public network, the matching server system including a processor, a user-profile database and a non-transitory computer-readable medium containing a sequence of instructions that, when executed by the processor, causes the processor to execute the following operations:
   automatically retrieve a plurality of stored images depicting visual appearances of individuals, including:
      a plurality of beta images including a plurality of control images initially stored in one or more third-party databases accessible over the public network, each of the plurality of control images depicting a visual appearance of one of a plurality of beta individuals including a first beta individual and a second beta individual, each beta individual having a plurality of beta physical features; and
      a first stored image depicting a visual appearance of a first individual having a first individual physical feature and being a potential match associated with a match profile stored in the user-profile database considered by the system for presentation to a match-viewing user;
   detect a comparable physical characteristic of the first and second beta individuals from the plurality of control images;
   select and present the plurality of beta images having the comparable physical characteristic of the first and second beta individuals to the user via a user display of a user-interface device communicatively coupled to the matching server system via the public network;
   receive feedback data from the user via the user-interface device over the public network, the feedback data indicating a level of physical attraction of the user to the first and second beta individuals based on the presented plurality of beta images, wherein the feedback data is processed by the attractiveness scoring engine to assign a personalized user attraction value to the comparable physical characteristic comprising one or more of the beta physical features and storing said personalized user attraction value in association with a user-profile of the user in the user-profile database;
   generate a compatibility value for the user based on at least the personalized user attraction value, a visual similarity value between the presented plurality of beta images and the first stored image, and one or more prediction factor values relevant to predicting a successful interpersonal relationship between the user and the first individual, wherein the visual similarity value is calculated by the attractiveness scoring engine by comparing the personalized user attraction value and the first individual physical feature; and
   selectively presenting the match profile of the first individual to the user via the user display over the public network based on the generated compatibility value matching or exceeding an attraction threshold value, including means for the user to contact the first individual;
   wherein the compatibility value reflects a likelihood of a successful interpersonal relationship between the user and the first individual,
   wherein the plurality of beta images are control images other than potential matches.

2. The computer-based system of claim 1, wherein the matching server system is further configured to:
   retrieve a second stored image from the user-profile database, the second stored image being of a second individual who is another potential match, having a second individual physical feature and having an associated match profile;
   when the match profile of the second individual is presented to the user, receive additional feedback from the user via the user-interface device over the public network, the additional feedback indicating a level of physical attraction to the second individual;
   generate a second compatibility value for the user and the second individual corresponding to the second stored image, the second compatibility value generated based on at least the user feedback, the additional user feedback, and a second calculated visual similarity value between the presented plurality of beta images, the stored image and the second stored image; and selectively presenting the match profile of the second individual corresponding to the third second stored image to the user based on the second generated compatibility value, including means for the user to contact the second individual.

3. The computer-based system of claim 2, wherein the user is presented with the plurality of beta images having the comparable physical characteristics of the first and second beta individuals and the stored image simultaneously based on previously computed visual similarity values.

4. The computer-based system of claim 1, wherein the visual similarity value is a feature vector calculated based at least in part using one or more of: statistical models, neuro-networks and vector machine probability.

5. The computer-based system of claim 2, wherein the second visual similarity value is a feature vector calculated based at least in part using one or more of: statistical models, neuro-networks and vector machine probability.

6. The computer-based system of claim 2, wherein the additional feedback data further comprises: a communication between the user and the second potential match.

7. The computer-based system of claim 1, wherein after the attractiveness scoring engine has assigned the personalized user attraction value of the first and second beta individuals to the comparable physical characteristic, the attractiveness scoring engine further:

calculates a plurality of attractiveness values for a plurality of additional images associated with a plurality of additional individuals having user-profiles stored in the user-profile database;

determines whether a minimum number of the plurality of attractiveness values meet a minimum threshold value; and if so, selectively presents the match profile of the second individual to the user.

8. The computer-based system of claim 7, wherein the attractiveness scoring engine ranks the plurality of attractiveness values such that the match profile of the individual is at least tied for the highest rank.

9. The computer based system of claim 7, wherein if the attractiveness scoring engine does not determine that a minimum number of the plurality of attractiveness values meet the minimum threshold value, the match profile of the individual that is selectively presented to the user will be randomly selected.

10. The computer-based system of claim 1, wherein match profiles are part of a subscription service and the match-viewing user is not a subscribing member and the system creates a temporary user-profile for the match-viewing user.

11. The computer-based system of claim 1, wherein the feedback data received is based on a series of interactive rating buttons.

12. The computer-based system of claim 1, wherein the third-party database is associated with a social network server system.

13. The computer-based system of claim 1, wherein the third-party database is associated with a third-party dating server system.

14. The computer-based system of claim 1, wherein the matching server system is further configured to:

retrieve a stored third beta image, the third beta image being of a third individual having a third individual physical feature;

when the match profile of the first individual is presented to the user, receive additional feedback from the user via the user-interface device over the public network, the additional feedback indicating a level of physical attraction to the third individual based on the presented third beta image, wherein the feedback data is processed by the attractiveness scoring engine to assign a personalized user attraction value to the third individual physical feature and storing this value in the database;

generate a second compatibility value for the user and the third individual, the second compatibility value generated based on at least the personalized user attraction value, a visual similarity value between the plurality of presented beta images, the first stored image, the third beta image and one or more prediction factor values relevant to predicting a successful interpersonal relationship between the user and a fourth individual who may be a potential match and has an associated user-profile stored in the user-profile database, wherein the visual similarity value is calculated by the attractiveness scoring engine by comparing the personalized user attraction value and the third individual physical feature; and selectively presenting the match profile of the fourth individual corresponding to a fourth stored image to the user based on the second generated compatibility value, including means for the user to contact the fourth individual.

* * * * *